(12) United States Patent
Huang et al.

(10) Patent No.: US 7,485,388 B2
(45) Date of Patent: Feb. 3, 2009

(54) FUEL CELL

(75) Inventors: Jin-Shu Huang, Hsinchu (TW); Ching-Po Lee, Hsinchu (TW); Nien-Hui Hsu, Hsinchu (TW); Cheng Wang, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 11/829,973

(22) Filed: Jul. 30, 2007

(65) Prior Publication Data

US 2008/0171254 A1    Jul. 17, 2008

(30) Foreign Application Priority Data

Jan. 17, 2007  (TW) .............. 96101779 A

(51) Int. Cl.
*H01M 8/00* (2006.01)
*H01M 8/04* (2006.01)
*H01M 2/14* (2006.01)

(52) U.S. Cl. .............. 429/34; 429/13; 429/17; 429/39

(58) Field of Classification Search .............. 429/12–46
See application file for complete search history.

(56) References Cited

U.S. PATENT DOCUMENTS

| 2002/0155336 A1* | 10/2002 | Acker ........................ 429/34 |
| 2003/0138684 A1* | 7/2003 | Tinker et al. ................ 429/27 |
| 2006/0024551 A1* | 2/2006 | Smotkin .................... 429/34 |
| 2007/0113803 A1* | 5/2007 | Froloff et al. ............ 123/90.11 |

* cited by examiner

*Primary Examiner*—Dah-Wei D Yuan
*Assistant Examiner*—Phoebe Riner
(74) *Attorney, Agent, or Firm*—Jianq Chyun IP Office

(57) ABSTRACT

A fuel cell including at least a membrane electrode assembly (MEA), a pipe, a pump and a linkage arrangement is provided. The MEA includes an anode layer, a cathode layer and an electrolyte layer disposed between the anode layer and the cathode layer. The pump is adapted to drive a fluid flowing in the pipe to provide fuel for the anode layer. The linkage arrangement includes a first blade, at least a second blade and a connecting element. The first blade is disposed inside the pipe and located on a flowing path of the fluid, and the fluid is adapted to drive the first blade to rotate. The second blade is disposed outside the pipe, and the connecting element is adapted to connect the first blade and the second blade so that the first blade drives the second blade to rotate to bring air to flow through the cathode layer.

10 Claims, 8 Drawing Sheets

FUEL CELL

CROSS-REFERENCE TO RELATED APPLICATION

This application claims the priority benefit of Taiwan application serial no. 96101779, filed Jan. 17, 2007. All disclosure of the Taiwan application is incorporated herein by reference.

BACKGROUND OF THE INVENTION

1. Field of the Invention

The present invention relates to a fuel cell and more particularly to proton exchange membrane fuel cell (PEMFC).

2. Description of Related Art

A proton exchange membrane fuel cell (PEMFC) includes a membrane electrode assembly (MEA), and the MEA includes a proton exchange membrane (PEM) and two electrode layers. The two electrode layers include an anode layer and a cathode layer. Furthermore, the two electrode layers are disposed on each side of the PEM. Fuel (such as methanol or hydrogen) for the anode layer reacts with a catalyst to generate hydrogen ions and electrons. The hydrogen ions pass through the PEM to the cathode layer, and the electrons pass through a circuit to the cathode layer. Next, the hydrogen ions and electrons react with the catalyst and oxygen in the cathode layer to generate water. Meanwhile, the traveling of the electrons forms a usable electric current.

It should be noted that the conventional fuel cell generally uses a fan or a pump to continuously transport anode reactant (such as methanol or hydrogen) to the surface of the anode layer and cathode reactant (such as oxygen) to the surface of the cathode layer respectively. As a result, the fuel cell is able to generate electricity continuously. However, because the fan and the pump consume some of the electrical energy generated by the fuel cell, the actual output energy from the fuel cell is lower. Furthermore, the fan and the pump are driven by electricity; the reliability and life span thereof are lower so that overall reliability and life span of the fuel cell are affected.

In addition, the rotating speeds of the fan and the pump have to be carefully controlled through a control element so as to match the amount of electrical power produced by the fuel cell. Consequently, a rather complicated circuit control of the conventional fuel cell is required.

SUMMARY OF THE INVENTION

The present invention is directed to provide a fuel cell that the rotating of the blade does not need to consume extra power when providing air for the cathode.

The present invention can be further understood from the technical features disclosed by the present invention.

To achieve these and other advantages, as embodied and broadly described herein, the present invention provides a fuel cell including at least one membrane electrode assembly (MEA), a pipe, a pump and a linkage arrangement. The MEA includes an anode layer, a cathode layer and an electrolyte layer disposed between the anode layer and the cathode layer. The pump is adapted to transport a fluid in the pipe to provide a fuel for the anode layer. The linkage arrangement includes a first blade, at least a second blade and a connecting element. The first blade is disposed inside the pipe and located on a flowing path of the fluid, and the fluid is adapted to drive the first blade to rotate. The second blade is disposed outside the pipe and the connecting element is adapted to connect the first blade and the second blade so that the first blade drives the second blade rotating to bring air flowing through the cathode layer.

In the present invention, the first blade of the linkage arrangement is disposed on the flowing path of the fluid. Therefore, the fluid drives the first blade to rotate when the pump drives the fluid flowing in the pipe. Through the connecting element, the first blade drives the second blade to rotate to bring air to flow through the cathode layer. Thus, the present invention does not need to consume extra electrical power to provide the required oxygen for the reaction of the cathode layer.

Other features and advantages of the present invention will be further understood from the further technology features disclosed by the embodiments of the present invention wherein there are shown and described preferred embodiments of this invention, simply by way of illustration of modes best suited to carry out the invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
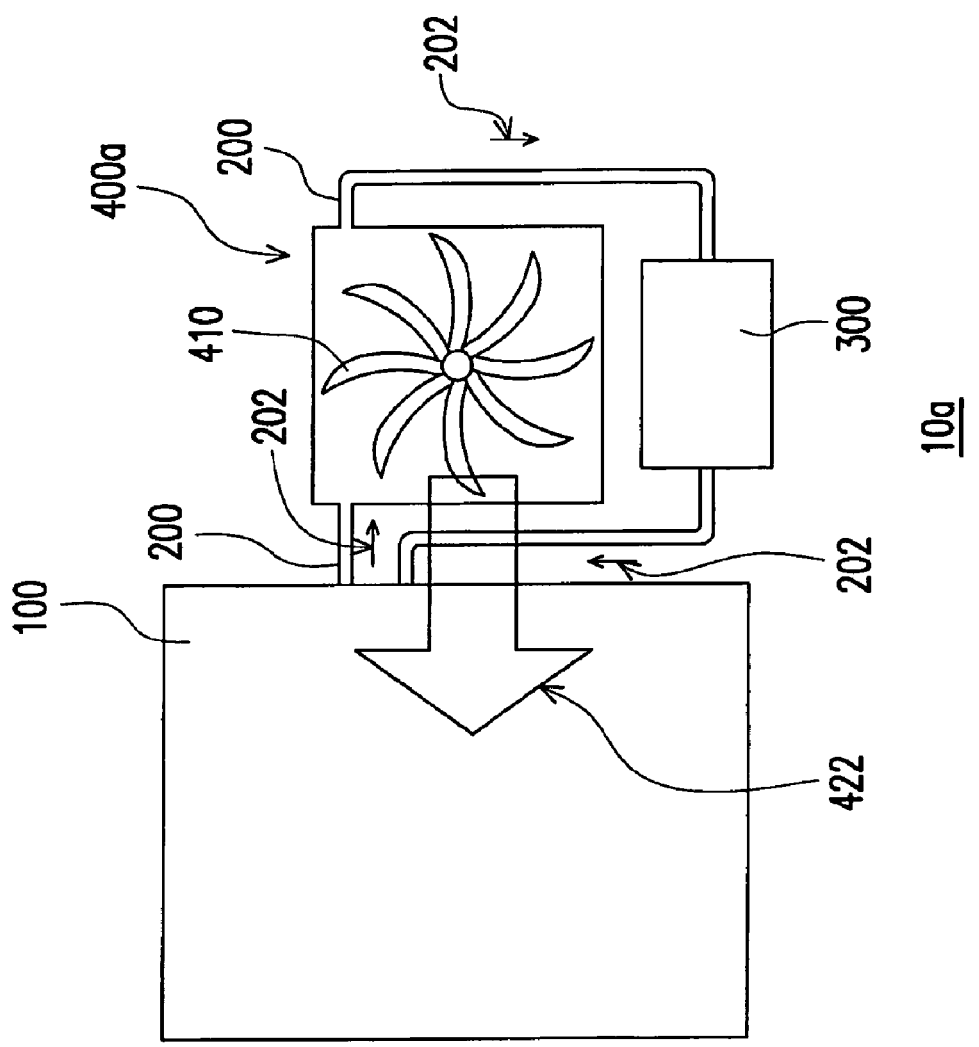
FIG. 1 is a schematic diagram of a fuel cell according to a first embodiment of the present invention.
Figure 2:
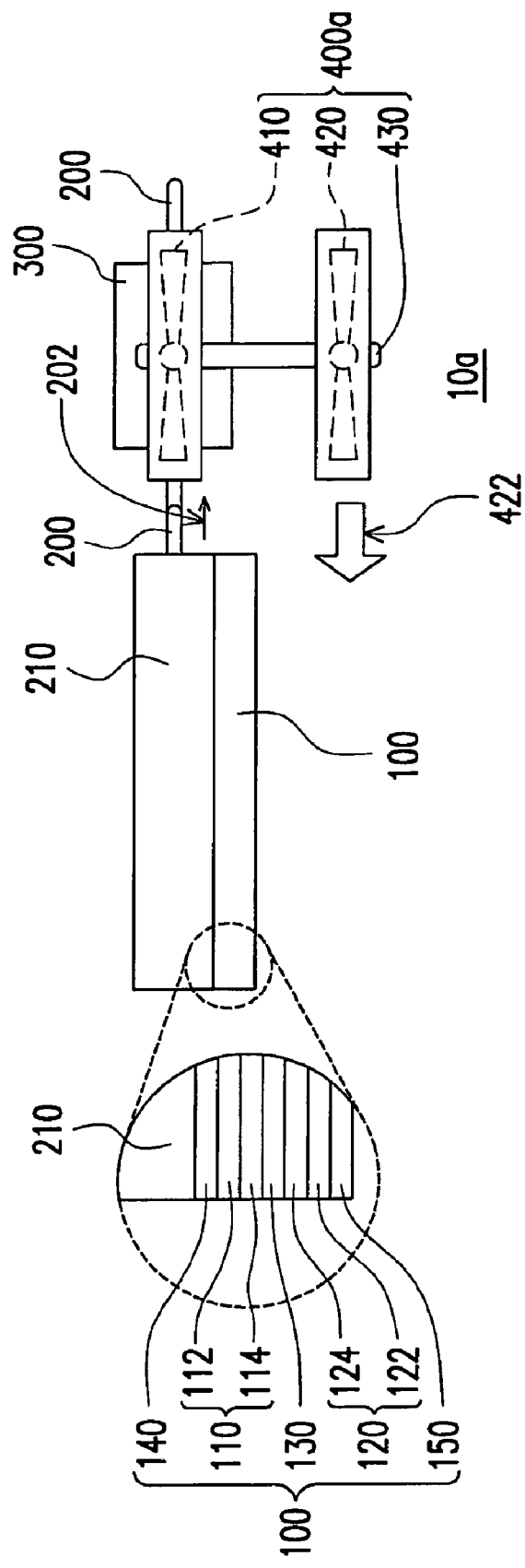
FIG. 2 is a side view of the fuel cell in FIG. 1.

As shown in FIGS. 1 and 2, a fuel cell 10a in a first embodiment of the present invention includes at least one membrane electrode assembly (MEA) 100, a pipe 200, a pump 300 and a linkage arrangement 400a. The MEA 100 includes an anode layer 110, a cathode layer 120, and an electrolyte layer 130 disposed between the anode layer 110 and the cathode layer 120. The pump 300 is adapted to drive a fluid (not shown) to flow in the pipe flowing in a direction as indicated by an arrow 202 and makes the fluid flow through the anode layer 110 to provide required fuel for the anode layer 110 of the MEA 100. The linkage arrangement 400a includes a first blade 410, at least a second blade 420 and a connecting element 430. The first blade 410 is disposed inside the pipe 200 and located on a flowing path of the fluid. The second blade 420 is disposed outside the pipe 200, and the connecting element 430 is adapted to connect the first blade 410 and the second blade 420. The fluid is adapted to drive the first blade 410 to rotate so that the first blade 410 drives the second blade 420 to rotate to bring air to flow through the cathode layer 120.

In the present embodiment, only one MEA 100 and one second blade 420 are used. Furthermore, the first blade 410 and the second blade 420 are the blades of a blower, for example. The first blade 410 and the second blade 420 are connected through the connecting element 430. Furthermore, the connecting element 430 is a rotary shaft, for example, connecting between the centers of the first blade 410 and the second blade 420 so that the first blade 410 and the second blade 420 rotate in identical speed and direction. The second blade 420 is parallel to the MEA 100, for example. In addition, the fuel cell 10a further includes a control unit (not shown) electrically connected to the pump 300. The control unit is used for controlling the rotating speed of the pump 300. When the pump 300 drives the fluid flowing in the pipe 200 in the direction as indicated by the arrow 202, the fluid drives the first blade 410 to rotate. At this time, the first blade 410 drives the second blade 420 rotating through the connecting element 430 and the second blade 420 drives air to flow through the cathode layer 120 in the direction as indicated by the arrow 422 to provide required oxygen for the reaction of the cathode layer 120.

More specifically, the electrolyte layer 130 is a proton exchange membrane (PEM) for transmitting hydrogen protons, for example. The anode layer 110 includes an anode catalyst layer 114 and an anode gas diffusion layer 112. The cathode layer 120 includes a cathode catalyst layer 124 and a cathode gas diffusion layer 122, for example. Furthermore, two collectors 140 and 150 are disposed outside the anode layer 110 and the cathode layer 120 respectively. The porous current collectors 140 and 150 include carbon and are used for enhancing electrical conductivity of the anode layer 110 and the cathode layer 120. In addition, the pipe 200 has a chamber 210 connected to the anode layer 110 and the chamber 210 has a flow field (not shown) for increasing contact area between the fluid and the anode layer 110. The flow field is, for example, a column flow field (CFF), a serpentine flow field (SFF), an interdigitated flow field (IFF) or other flow field structure.

For example, when the fuel cell 10a is a direct methanol fuel cell (DMFC), then the fluid is a methanol solution and the electrolyte layer 130 (the PEM) is a high molecular weight membrane. The material forming the anode catalyst layer 114 includes, for example, platinum/ruthenium (Pt/Ru) alloy, carbon particles with surface-plated platinum/ruthenium alloy, carbon particles with surface-plated platinum or other suitable material. The material forming the porous current collectors 140 and 150 includes a conductive material, for example, titanium (Ti) and its alloys, or other metal capable of resisting methanol corrosion. Alternatively, the porous current collectors 140 and 150 are fabricated in a circuit board build-up process (with a gold-plated surface). Carbon dioxide, the reaction product of the anode layer 110, is eliminated via the pores of the porous current collector 140. Similarly, oxygen, the reactant of the cathode layer 120, is made contact with the cathode catalyst layer 124 via the pores of the porous collector 150.

In the aforementioned embodiment, there is no need to consume extra electrical power when the linking arrangement 400a of the fuel cell 10a provides air to the cathode layer 120. As a result, the present invention reduces power consumption when the fuel cell 10a generates electricity, and the power efficiency of the fuel cell 10a is increased. Moreover, the linkage arrangement 400a is not driven by electrical power, but is driven to rotate by the fluid. Consequently, the linkage arrangement 400a has a higher reliability and a longer life span. Furthermore, the control unit only has to control the operation of the pump 300. In addition, the power capacity of the fuel cell 10a changes, the control unit only has to control the rotational speed of the pump 300. Then, the reacting rates in the anode layer 110 and the cathode layer 120 are adjusted simultaneously. Therefore, the fuel cell 10a has a simpler power control circuit.

Figure 3:
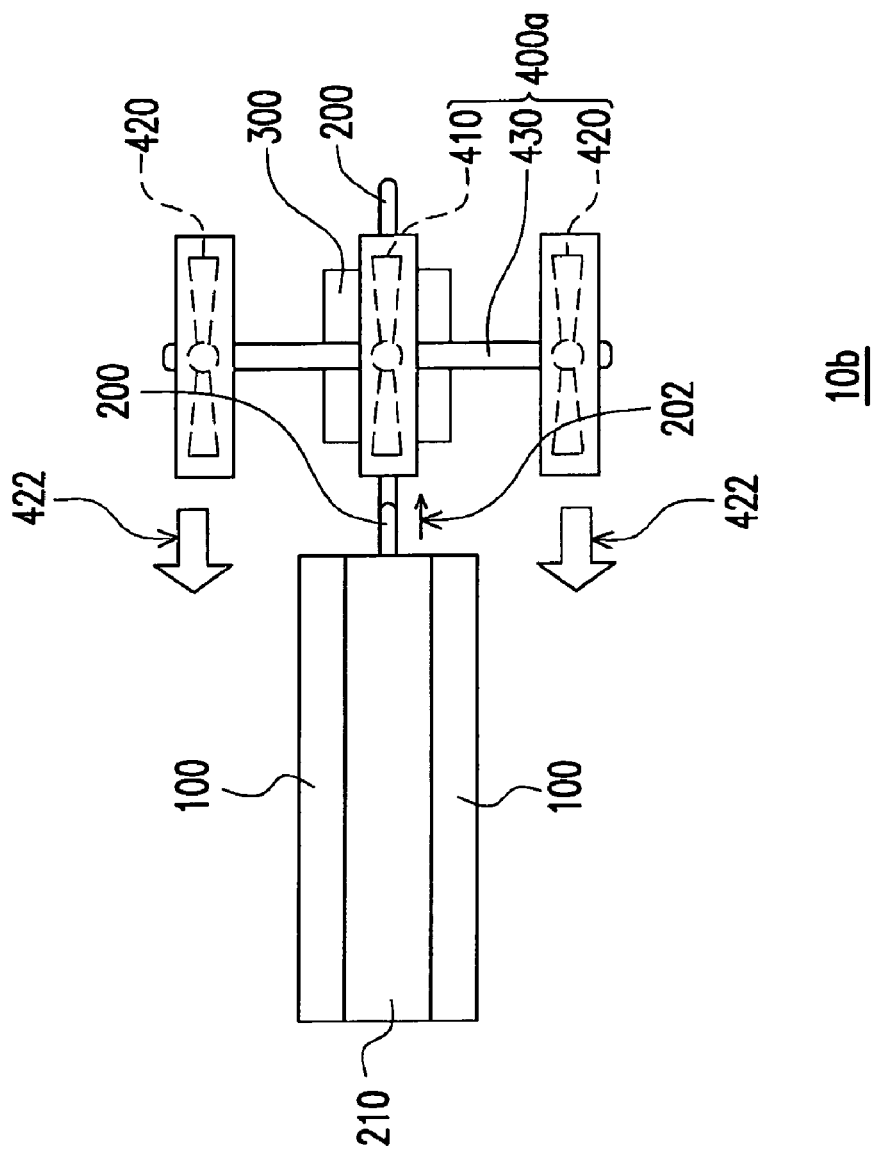
FIG. 3 is a side view of a fuel cell according to a second embodiment of the present invention.

As shown in FIGS. 1 and 3, the fuel cell 10b in the second embodiment of the present invention is substantially similar to the fuel cell 10a in FIG. 2. The main difference is that two MEA 100 and two second blades 420 are used in the second embodiment. The two MEAs 100 are disposed on two opposite sides of the chamber 210 and the chamber 210 is connected between the two anode layers 110 of the two MEA 100. Furthermore, the second blades 420 are disposed on two opposite sides of the first blade 410 so that the second blades 420 drive the air to flow through the cathode layers 120 of corresponding MEA 100 which are disposed on the two opposite sides of the chamber 210.

Figure 4:
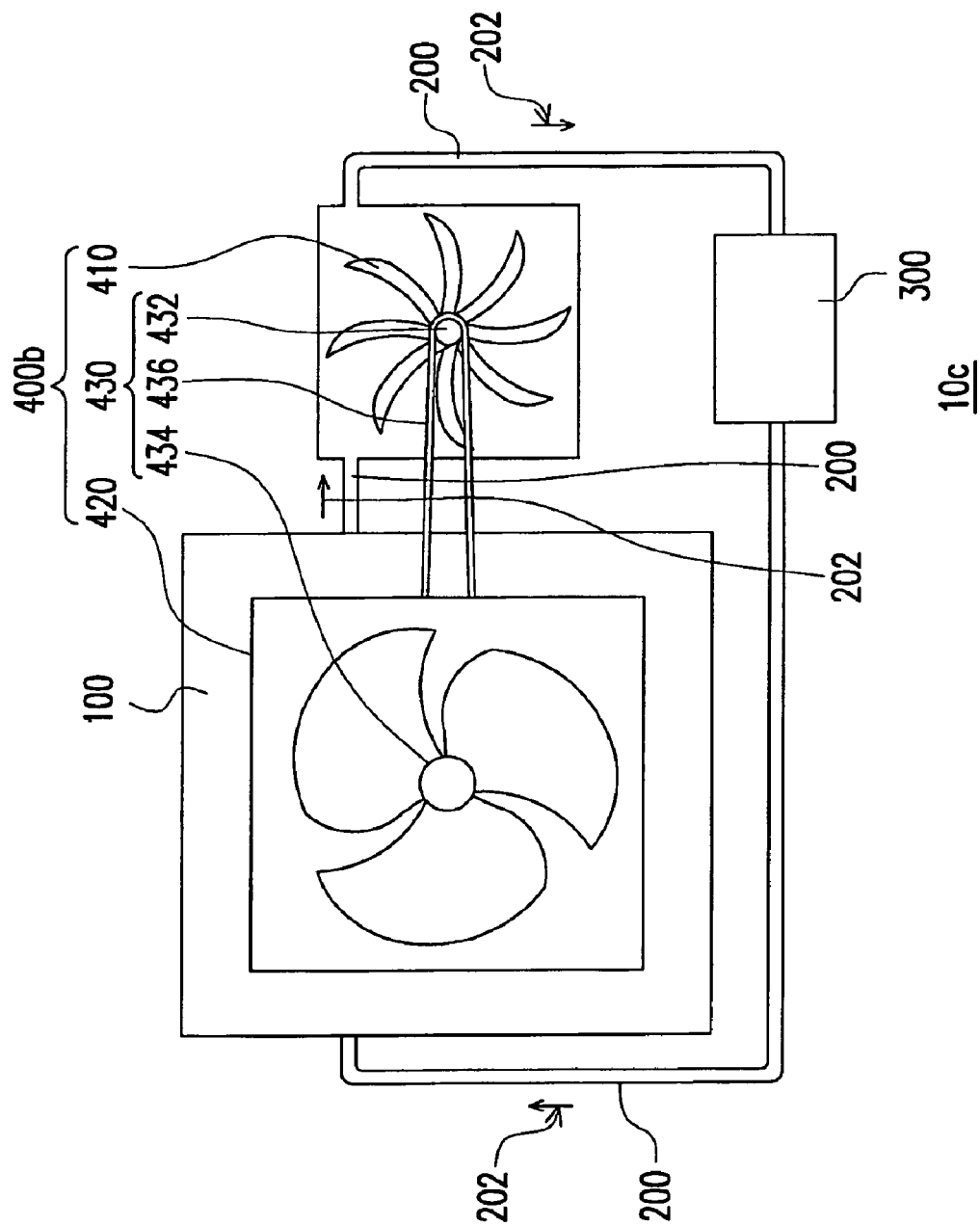
FIG. 4 is a schematic diagram of a fuel cell according to a third embodiment of the present invention.
Figure 5:
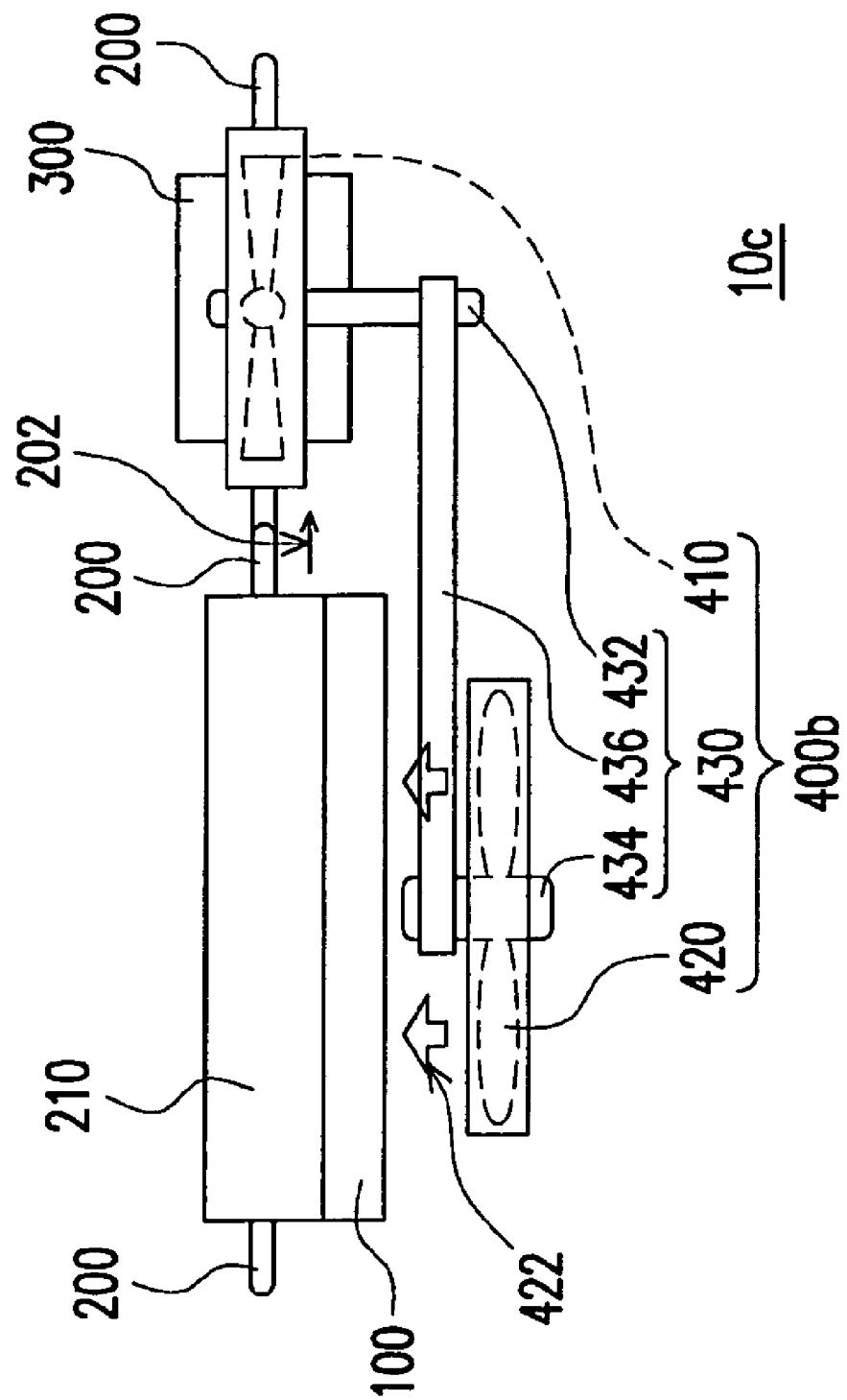
FIG. 5 is a side view of the fuel cell in FIG. 4.

As shown in FIGS. 4 and 5, the fuel cell 10c in the third embodiment of the present invention is substantially similar to the fuel cell 10a in FIGS. 1 and 2. The main difference is that the structure of the linkage arrangement 400b and the pipe 200 in the present embodiment is disposed in a manner different from the first embodiment. The second blade 420 of the linkage arrangement 400b is the blade of an axial fan and the connecting element 430 includes a first rotary shaft 432, a second rotary shaft 434 and a transmission belt 436. The first rotary shaft 432 is connected to the first blade 410 and the second rotary shaft 434 is connected to the second blade 420. Furthermore, the first rotary shaft 432 and the second rotary shaft 434 are connected through the transmission belt 436. The first rotary shaft 432 and the second rotary shaft 434 have different outer diameters so that the first blade 410 and the second blade 420 have different rotating speeds. Moreover, the second blade 420 is the blade of an axial fan, for example. Thus, the second blade 420 drives air to flow through the cathode layer 120 in the direction as indicated by the arrow 422 when the first blade 410 drives the second blade 420 rotating through the connecting element 430.

Figure 6:
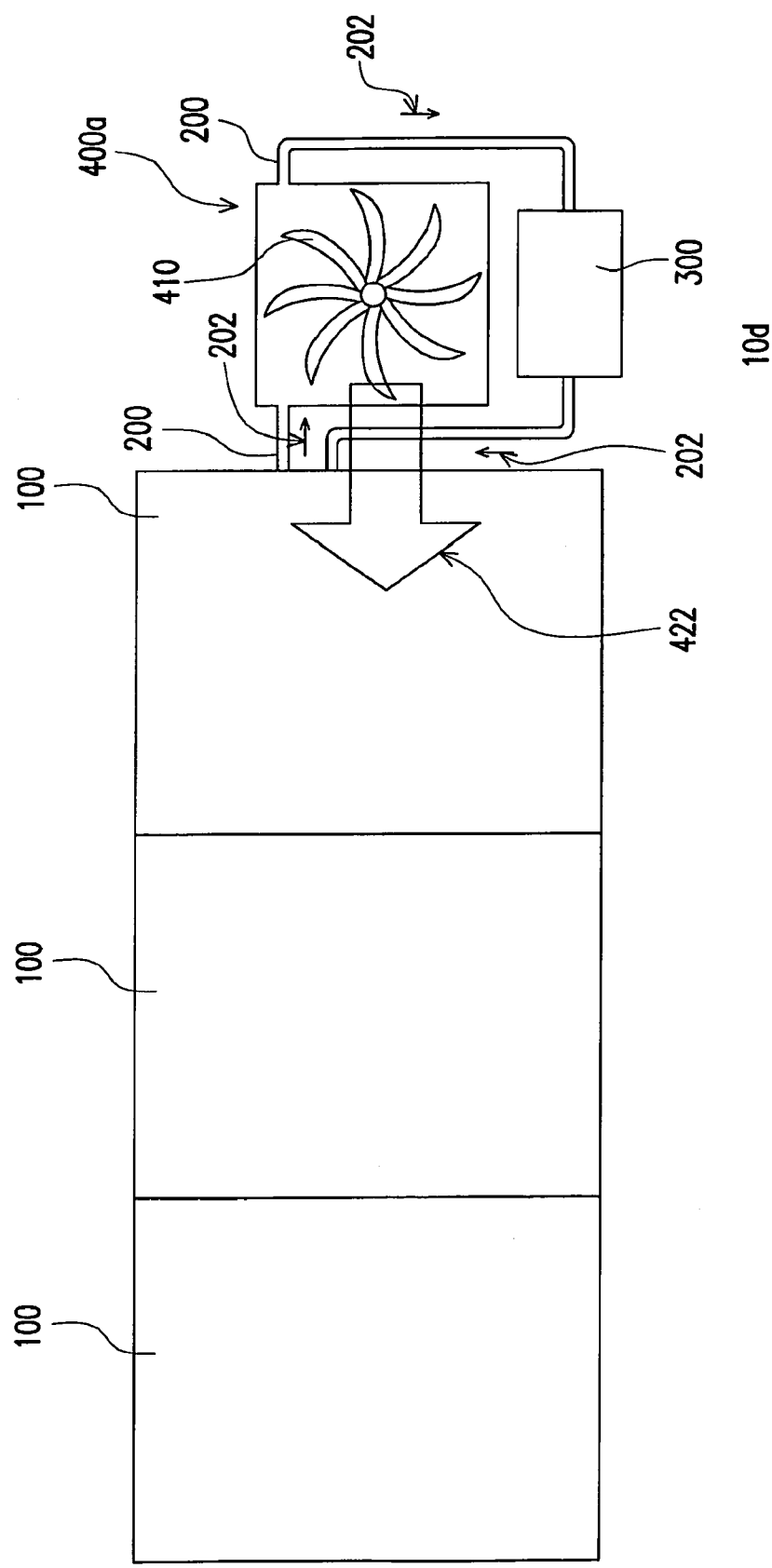
FIG. 6 is a schematic diagram of a fuel cell according to a fourth embodiment of the present invention.
Figure 7:
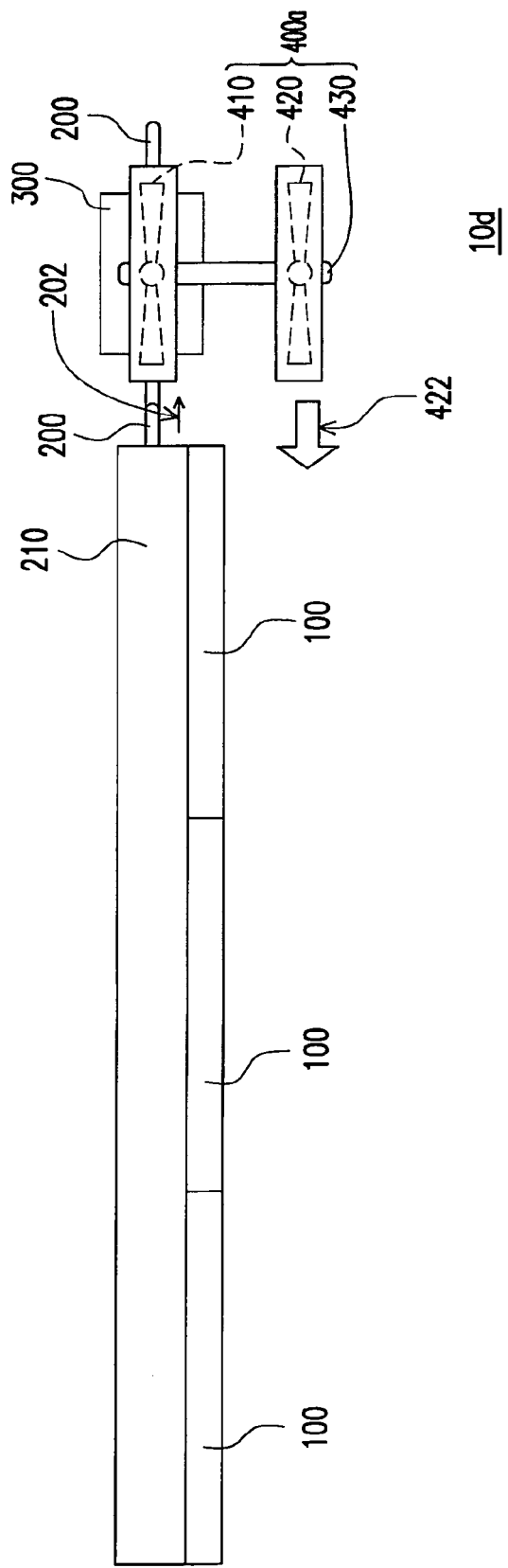
FIG. 7 is a side view of the fuel cell in FIG. 6.

As shown in FIGS. 6 and 7, the fuel cell 10d in the fourth embodiment of the present invention is substantially similar to the fuel cell 10a in FIGS. 1 and 2. The main difference is in the number of MEA 100 used in the two embodiments. In the present embodiment, there are three MEAs 100. Furthermore, the three MEAs 100 are arranged in a 1×3 array on one side of the chamber 210, for example.

Figure 8:
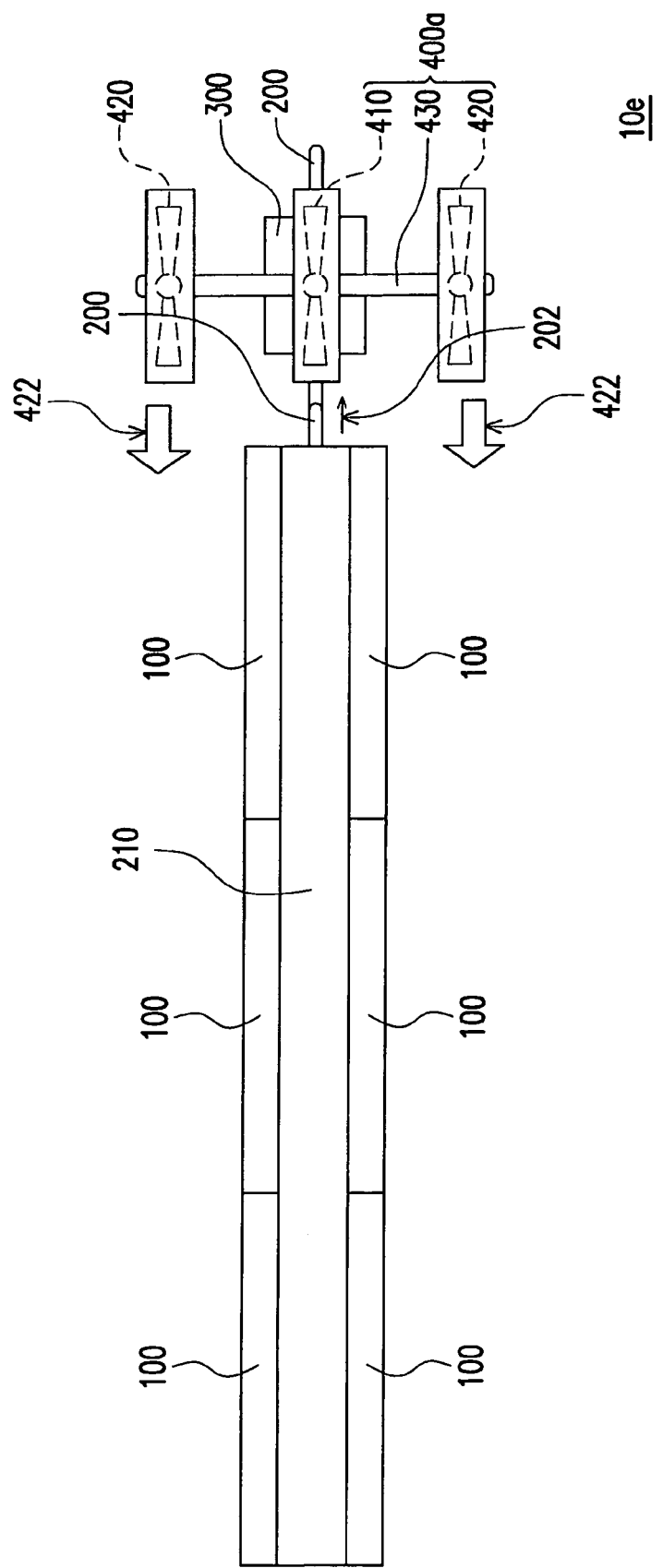
FIG. 8 is a side view of a fuel cell according to a fifth embodiment of the present invention.

As shown in FIGS. 6 and 8, the fuel cell 10e in the fifth embodiment of the present invention is substantially similar to the fuel cell 10b in FIG. 3. The main difference is in the number of MEA 100 used in the two embodiments. In the present embodiment, there are six MEAs 100. Furthermore, the six MEAs 100 are arranged in two 1×3 arrays on the two opposite sides of the chamber 210 respectively, for example.

However, the present invention is not limited to the aforementioned embodiments. For example, the first blade 410 not only may be the blade of an axial fan or a turbine, the first blade 410 may also be other rotating element that is driven by a fluid. Similarly, the second blade 420 may also be other element capable of inducing airflow. In addition, the connecting elements 400a and 400b may include gear sets so that the first blade 410 and the second blade 420 not only have different rotating speeds due to the gear structure, but also have different rotating directions. Moreover, each of the connecting elements 400a and 400b may be an assembly having a rotary shaft, a gear set and a transmission belt. Furthermore, the number of MEA 100 is not limited to the quantities used in the foregoing embodiments, and the number of second blades 420 used in the fuel cell may also be more than two.

In summary, the fuel cell of the present invention has at least the following advantages:

1. The fuel cell in the present invention consumes less electrical power compared with the conventional fuel cell. Therefore, the power efficiency of the fuel cell in the present invention is higher.

2. Rotation in the linkage arrangement in the present invention is not driven by electrical power but by fluid motion. Therefore, the linkage arrangement is more reliable and has a longer life span.

3. The control unit in the present invention only has to control the operation of the pump. Moreover, the power capacity of the fuel cell changes, the control unit only has to control the rotational speed of the pump. Then, the reacting rates in the anode layer and the cathode layer are adjusted simultaneously. Therefore, the fuel cell has a simpler power control circuit.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fuel cell, comprising:
   at least one membrane electrode assembly, having:
      an anode layer;
      a cathode layer; and
      an electrolyte layer, disposed between the anode layer and the cathode layer;
   a pipe;
   a pump, adapted to transport a fluid in the pipe to the anode layer, so as to provide fuel for the anode layer; and
   a linkage arrangement, having:
      a first blade, disposed inside the pipe, wherein the fluid flows through the first blade and the pump and is then transported to the anode layer, and the fluid is adapted to drive the first blade to rotate;
      at least one second blade, disposed outside the pipe; and
      a connecting element, adapted to connect the first blade and the second blade, the first blade driving the second blade to rotate through the connecting element to bring air to flow through the cathode layer.

2. The fuel cell as claimed in claim 1, wherein the electrolyte layer is a proton exchange membrane, the anode layer comprises an anode catalyst layer and an anode gas diffusion layer, the cathode layer comprises a cathode catalyst layer and a cathode gas diffusion layer, and the fluid is methanol solution.

3. The fuel cell as claimed in claim 1, wherein the pipe further comprises a chamber connected to the anode layer.

4. The fuel cell as claimed in claim 3, wherein a plurality of membrane electrode assemblies is used and the membrane electrode assemblies are arranged in an array on one side of the chamber.

5. The fuel cell as claimed in claim 3, wherein a plurality of membrane electrode assemblies is used and the membrane electrode assemblies are arranged in an array on two opposite sides of the chamber.

6. The fuel cell as claimed in claim 5, wherein two second blades are used and the second blades are adapted to drive air to flow through the cathode layers disposed on the two opposite sides of the chamber.

7. The fuel cell as claimed in claim 1, wherein the first blade is a blade of an axial fan, a blower or a turbine.

8. The fuel cell as claimed in claim 1, wherein the second blade is a blade of an axial fan or a blower.

9. The fuel cell as claimed in claim 1, wherein the connecting element is a rotary shaft connecting between centers of the first blade and the second blade.

10. The fuel cell of claim 1, wherein the connecting element comprises a first rotary shaft, a second rotary shaft and a transmission belt, the first rotary shaft is connected to the first blade, the second shaft is connected to the second blade, and the first rotary shaft is connected to the second rotary shaft through the transmission belt.

* * * * *